United States Patent [19]
Takenoya et al.

[11] Patent Number: 5,681,465
[45] Date of Patent: Oct. 28, 1997

[54] FILTRATION EQUIPMENT WITH FILTRATE RECOVERY PROCESS

[75] Inventors: Kenichi Takenoya; Katsuoki Kawanishi; Shoji Kawamori; Tsuyoshi Tsubone; Kouhei Kobayashi, all of Kawaguchi; Toshimi Zaitsu, Yokohama, all of Japan

[73] Assignees: Sapporo Breweries Ltd., Tokyo; Human Techno Co., Ltd., Yokohama, both of Japan

[21] Appl. No.: 600,918

[22] PCT Filed: Jun. 22, 1995

[86] PCT No.: PCT/JP95/01253
  § 371 Date: Jun. 14, 1996
  § 102(e) Date: Jun. 14, 1996

[87] PCT Pub. No.: WO96/00121
  PCT Pub. Date: Jan. 4, 1996

[30] Foreign Application Priority Data

Jun. 24, 1994 [JP] Japan ................................ 6-142751
Jun. 19, 1995 [JP] Japan ................................ 7-151820

[51] Int. Cl.⁶ .................................................. B01D 29/15
[52] U.S. Cl. .................... 210/323.2; 210/332; 210/401; 210/410; 210/416.1
[58] Field of Search ................................ 210/331, 322, 210/323.1, 323.2, 332, 407, 410, 416.1

[56] References Cited

FOREIGN PATENT DOCUMENTS

| 422405 | 1/1992 | Japan . |
|---|---|---|
| 576710 | 3/1993 | Japan . |

*Primary Examiner*—W. L. Walker
*Attorney, Agent, or Firm*—Oblon, Spivak, McClelland, Maier & Neustadt, P.C.

[57] ABSTRACT

In a filtration equipment with a filtrate recovery process, in order to achieve reduction in recovery time of suspension in a tank and allow sludge such as filtration aid to be exfoliated readily from filtration elements and discharged, pressurized water is introduced into the tank which includes tubular filtration elements and a plate element provided at upper and lower locations thereof to recover the suspension as filtrate, and pressurized gas such as air or carbon dioxide is introduced into the tank from the suspension side so that water remaining on the suspension side is discharged from the tank by the pressurized gas, whereafter sludge is exfoliated from the filtration elements and then discharged to the outside of the tank.

5 Claims, 10 Drawing Sheets

FILTRATION EQUIPMENT WITH FILTRATE RECOVERY PROCESS

FIELD OF THE INVENTION

This invention relates to filtration equipment for clarifying food products such as beer or sake or for clarifying chemical products such as flocculants or paper coating agents, and more particularly to filtration equipment with a filtrate recovery apparatus.

BACKGROUND OF THE INVENTION

Conventionally, as filtration equipment of the type described, filtration equipment of the suspended filtration element type and filtration equipment of the upright filtration element type are known.

First, a conventional filtration equipment of the suspended element type is described with reference to FIG. 10. FIG. 10 is a partial sectional view of a conventional filtration equipment of the suspended element type.

As shown in FIG. 10, a filtration equipment of the type described includes an upper tank 101a and a lower tank 101b partitioned and sealed from each other by a partition plate 103. A plurality of tubular filtration elements 102 made of a ceramics material and each closed at the lower end thereof are provided in a suspended condition on the partition plate 103.

Suspension to be filtered is supplied into the lower tank 101b by a pump 110 and is filtered by the tubes of the filtration elements 102, whereafter it is collected into the upper tank 101a through hollow portions. The filtrate filtered and collected into the upper tank 101a is delivered to a filtrate storage tank (not shown). Filter aid is precoated on the surface of each of the filtration elements 102 so that choking of the filtration elements 102 is prevented to maintain a stabilized filtration capacity.

A conventional filtration equipment of the upright filtration element type is described with reference to FIG. 11. FIG. 11 is a sectional view of a conventional filtration equipment of the upright element type.

As shown in FIG. 11, a filtration equipment 121 of the type mentioned includes a delivery pipe 125 provided at a lower portion of a tank 121a and connected to a filtrate storage tank (not shown), and a plurality of tubular filtration elements 122 are provided uprightly on a delivery pipe 125. Hollow portions of the filtration elements 122 and a hollow portion of the delivery pipe 125 are communicated with each other so that the suspension supplied to the tank 121a passes through and is filtered by the filtration elements 122 and then delivered to the filtrate storage tank through the delivery pipe 125. It is to be noted that, also with the filtration equipment 121 of the upright element type, filter aid is precoated on the surfaces of the filtration elements 122 in order to maintain a stabilized filtration capacity.

By the way, whether the filtration equipment is of the suspended element type or of the upright element type described above, although filter aid is precoated on the surfaces of the filtration elements, if filtered substances adhere to and are deposited in a large amount on the surfaces of the filtration elements, then the filtration capacity of the filtration equipment is deteriorated. Therefore, the filtered substances deposited on the surfaces of the filtration elements must be removed by washing in accordance with necessity. In this instance, the filtration operation is interrupted once and the suspension remaining in the tank is processed, and then the filtration elements are washed individually.

For the processing of the suspension remaining in the tank, it would seem possible to recover the full amount of the suspension from the tank and then resume filtration processing after the filtration elements are washed. However, since filtered substances deposited on the surfaces of the filtration elements merely adhere to the surfaces of the filtration elements by a pressure difference caused by flows of the liquid from the suspension side (primary side) to the filtrate side (secondary side), there is the possibility that, upon recovery, the filtered substances (including the filter aid) deposited on the surfaces of the filtration elements may exfoliate and mix into the suspension. Further, in filtration of, for example, beer, when it is tried to produce a different product of beer having a different quality by the same process, the beer cannot be returned to a preceding step to perform filtration again. Accordingly, upon changing over to a product of a different quality, the remaining suspension must be recovered at the preceding step.

Therefore, it is a conventional practice to supply water gently into a tank from a lower portion to recover suspension such as beer being filtered to the secondary side in such a manner that the suspension being filtered and the water are not mixed with each other as far as possible (hereinafter referred to as "water drive") or in order to process suspension in a condition in which the pressure difference between the primary side and the secondary side is maintained, by introducing pressurized air or pressurized gas such as carbon dioxide into the tank to filter the remaining suspension with the pressure of the pressurized air and then recover the thus filtered suspension.

DISCLOSURE OF THE INVENTION

However, where the water drive is employed, even if water is supplied very gently, the water is mixed into the suspension, and as a result, filtrate diluted with water is recovered. Consequently, the recovered filtrate cannot be used as a product. Even if careful water drive is performed to recover the filtrate in such a manner that the suspension being filtered and the water are not mixed with each other, if the level of the water reaches the filtration elements, then the water is mixed into the filtrate. Consequently, the filtrate since then cannot be used as a product, resulting in much waste.

Further, when pressurized gas is supplied into the tank to process the remaining suspension, if the suspension in the tank has a level sufficient to reach the filtration elements, then the suspension can be filtered and recovered. However, if the level becomes lower than the filtration elements, then the suspension can no longer be filtered or recovered, and some always remains non-recovered. Particularly where the filtration equipment is of the suspended element type, if the level drops until upper portions of the filtration elements are exposed, then the pressurized gas will flow into a delivery route of the filtrate through the filtration elements, substantially resulting in failure in filtration and recovery.

Accordingly, it is an object of the present invention to provide a filtration equipment with a filtrate recovery process which can filter and recover all suspension in a tank in a short time.

In order to attain the object described above, according to the present invention, a filtration equipment with a filtrate recovery process is characterized in that it comprises a tank to which suspension is supplied, tubular filtration elements provided in the tank for filtering the suspension, delivery means for delivering the filtrate filtered by the tubular filtration elements to the outside of the tank, a plate filtration element located below the tubular filtration elements in the inside of the tank for maintaining the airtightness of the space in which the tubular filtration elements are provided, second delivery means for delivering the filtrate filtered by the plate filtration element to the outside of the tank, and pressurized gas introduction means for introducing pressurized gas into the tank when the suspension in the tank is recovered.

Another filtration equipment with a filtrate recovery apparatus is characterized in that it comprises a tank to which suspension before filtration is supplied, tubular filtration elements provided in the tank for filtering the suspension, delivery means for delivering the filtrate filtered by the tubular filtration elements to the outside of the tank, a plate filtration element located below the tubular filtration elements in the inside of the tank for maintaining the airtightness of the space in which the tubular filtration elements are provided, second delivery means for delivering the filtrate filtered by the plate filtration element to the outside of the tank, pressurized liquid introduction means for introducing pressurized liquid into the tank when the suspension in the tank is recovered, and pressurized gas introduction means for introducing pressurized gas into the tank in order to discharge the pressurized liquid, to the outside of the tank.

Each of the filtration equipments is further characterized in that the suspension in the tank is filtered simultaneously by the tubular filtration element and the plate filtration element, or/and that the plate filtration element is installed in a manner that it can be inclined with respect to a horizontal plane.

In any of the filtration equipments with a filtrate recovery process of the present invention, since the tubular filtration elements and the plate filtration element are provided in the inside of the tank, filtration of suspension in the tank is performed by both filtration elements, and the filtrate is delivered to the outside of the tank by their respective delivery means.

When the suspension in the tank is to be recovered such as when the filtration elements are to be washed, pressurized gas is introduced into the inside of the tank by the pressurized gas introduction means so that the suspension remaining in the tank is delivered by the pressure of the pressurized gas and recovered. In this instance, although filtration is performed by both filtration elements and the filtrate is recovered, after the level of the suspension in the tank becomes lower than a fixed level, filtration by the tubular filtration elements becomes impossible. However, since the plate filtration element is provided below the tubular filtration elements so that the airtightness of the space in which the tubular filtration elements is provided may be kept, the remaining suspension is filtered by the plate filtration element and recovered.

In a filtration equipment with a filtrate recovery process which includes filtration elements with a siphon pipe suspended at an upper portion of a tank and a rotational plate filtration element provided at a lower portion of the tank, pressurized water is introduced into the tank through an upper portion to recover suspension as filtrate, and then gas such as air or carbon dioxide is pressurized from an upper portion of the suspension side to discharge the water remaining on the suspension side through an outlet port provided at a lower portion of the tank. Thereafter water is expelled from sludge adhering to the filtration elements by the pressurized gas and the lower plate filtration element is opened to remove the sludge from the filtration elements and discharge it as dry sludge.

Further, where filter aid is precoated on the surfaces of the filtration elements in order to maintain a stabilized filtration capacity, if solution is not flowing from the primary side (suspension side) to the secondary side (filtrate side) of the filtration elements, the precoat layers exfoliate. Therefore, by performing filtration by both the tubular filtration elements and the plate filtration element, the precoat layers on the filtration elements does not exfoliate during filtration.

Furthermore, where the plate filtration element is installed so that it can be inclined with respect to the horizontal plane, filtered substances deposited on the plate filtration element drop by their own weight when the plate filtration element is pivoted and are removed from the plate filtration element.

As described above, according to the present invention, since the filtration equipment includes the plate filtration element provided below the tubular filtration elements and the second delivery means for delivering the filtrate filtered by the plate filtration element to the outside of the tank, the suspension in the tank is recovered, all the suspension remaining in the tank can all be filtered and recovered.

Further, by filtering the suspension in the tank simultaneously by the tubular filtration elements and the plate filtration element, where filter aid is precoated on the surfaces of the filtration elements, exfoliation of the precoat layers during filtration can be prevented.

Furthermore, by installing the plate filtration element so that it can be inclined with respect to the horizontal plane, mere inclination of the plate filtration element can readily remove filtered substances deposited on the plate filtration element.

BEST FORMS IN EMBODYING THE INVENTION

Embodiments of the present invention are described below with reference to the drawings.

( First Embodiment )

Figure 1:
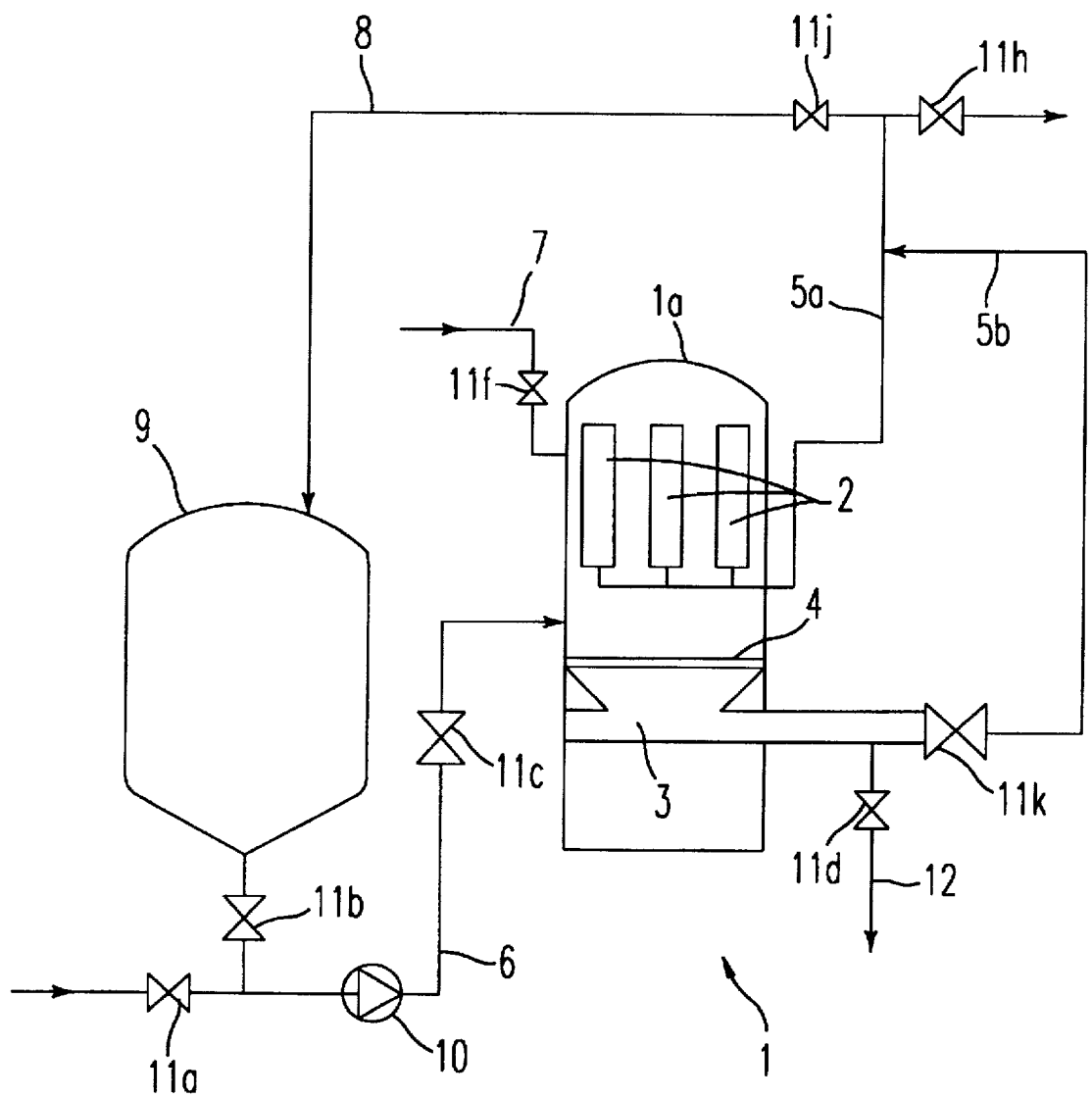
FIG. 1 is a schematic view of a filtration system employing a first embodiment of the filtration equipment of the present invention.

FIG. 1 is a schematic view of a filtration system which employs a first embodiment of the filtration equipment of the present invention. As shown in FIG. 1, the filtration equipment 1 of the present embodiment is the filtration equipment 1 of the upright element type, and a first delivery pipe 5a serving as delivery means connected to a filtrate storage tank (not shown) is provided in a tank 1a such that it extends through a side wall of the tank 1a. In the inside of the tank 1a, a plurality of tubular filtration elements 2 are provided uprightly on the first delivery pipe 5a, and hollow portions of the tubular filtration elements 2 and a hollow portion of the first delivery pipe 5a are communicated with each other. For the tubular filtration elements 2, a known cylindrical filter made of a ceramics material, a porous cylindrical filter made of a sintered metal, a filter of the winding type wherein a wire is wound in a coil on a cylindrical member and filtration is performed through gaps of the wire or some other filter is used.

Further, at the bottom of the tank 1a, a filtrate collection vessel 3 connected to a second delivery pipe 5b, which serves as second delivery means, via a valve 11k is secured. A plate filtration element 4 is mounted on the top face of the filtrate collection vessel 3. A packing (not shown) is provided over the entire circumference of the vessel along the outer peripheral edge of the plate filtration element 4, and the airtightness of the space in the inside of the tank 1a in which the tubular filtration elements 2 are provided is maintained by the packing. Airtightness is necessary to prevent leakage of the suspension supplied into the tank 1a from above the plate filtration element 4 to a location below the plate filtration element 4. For the plate filtration element 4, a filter made of a ceramics material, a porous filter made of a sintered metal or some other filter is used. Meanwhile, a discharging pipe 12 for discharging cleansing solution therethrough upon washing of the tubular filtration elements 2 is connected to the filtrate collection vessel 3 via a valve 11d.

The second delivery pipe 5b joins to an intermediate portion of the first delivery pipe 5a, and a valve 11h is provided on the downstream side of the first delivery pipe 5a with respect to the joining portion of the first delivery pipe 5a to the second delivery pipe 5b. Consequently, the second delivery pipe 5b is connected to the filtrate storage tank via the first delivery pipe 5a.

A suspension supply pipe 6 is connected to a portion of the tank 1a above the plate filtration element 4 via a valve 11c. A pump 10 is provided for the suspension supply pipe 6, and by changing over valves 11a and 11b, the suspension stored in a suspension tank (not shown) or precoating solution stored in a precoat tank 9 is supplied into tank 1a. The precoating solution contains filter aid to be precoated on the surfaces of the tubular filtration elements 2 and the plate filtration element 4 prior to filtration of the suspension. For the filter aid, diatomaceous earth, perlite, cellulose or some other substance is used.

A gas introduction pipe 7 serving as pressurized gas introduction means for introducing pressurized air or pressurized gas such as carbon dioxide into the inside of the tank 1a is connected to an upper portion of the tank 1a, and a valve 11f is provided for the gas introduction pipe 7.

A precoating solution feedback pipe 8 is provided to return precoating solution supplied to the filtration equipment 1 into the precoat tank 9, and is connected to the upstream side of the first delivery pipe 5a with respect to the valve 11h and provided with a valve 11j.

It is to be noted that, while a filter made of a porous material such as a ceramics material or a sintered metal, or a filter of the winding type (tubular filtration element) or a filter cloth (both utilized for a plate filtration element) can be used as a material for the tubular filtration elements 2 and the plate filtration element 4, since the elements may possibly be corrode depending upon the properties of the suspension (acid, the alkali, high temperature and so forth), an optimum material is used as the material of the elements depending on the properties of the suspension.

Next, operation of the filtration system of the present embodiment is described.

First, precoating processing which is performed prior to filtration of the suspension is described. When precoating, the valves 11b, 11c, 11k and 11j are opened, and the pump 10 is started to circulate precoating solution from the precoat tank 9 through the suspension supply pipe 6→filtration equipment 1→first delivery pipe 5a, second delivery pipe 5b→precoating solution feedback pipe 8→precoat tank 9. Consequently, a precoat layer is formed on the surfaces of the tubular filtration elements 2 and the surface of the plate filtration element 4.

Next, the filtering operation is described. The valves 11a, 11c, 11h and 11k are opened and the pump 10 is started. Consequently, the suspension in the suspension tank is supplied into the tank 1a through the suspension supply pipe 6, and is filtered by the tubular filtration elements 2 and the plate filtration element 4. The filtrate filtered by the tubular filtration elements 2 is delivered to the filtrate storage tank through the first delivery pipe 5a. Meanwhile, the filtrate filtered by the plate filtration element 4 is collected into the filtrate collection vessel 3 and delivered to the filtrate storage tank through the second delivery pipe 5b.

Here, while filtration is performed simultaneously by both of the tubular filtration elements 2 and the plate filtration element 4, it is also possible to close valve valve 11k to perform filtration only by the tubular filtration elements 2. However, unless the solution is flowing, during filtration, from the primary side (suspension side) to the secondary side (filtrate side), that is, unless the precoat layers remain pressed against the surfaces of the filtration elements, the precoat layers are liable to be exfoliate, and therefore, the tubular filtration elements 2 must always be kept in a filtering condition. Further, by performing filtration by the tubular filtration elements 2 and the plate filtration element 4, the filtration processing rate is increased and also the filtration efficiency is improved.

If filtration is performed for a long period of time, then filtered substances adhere to and are deposited on the surfaces of the tubular filtration elements 2 and the surface of the plate filtration element 4. Since the filtration capacity is deteriorated if filtered substances are deposited on the surfaces of the tubular filtration elements 2 and the surface of the plate filtration element 4, the tubular filtration elements 2 and the plate filtration element 4 are washed when necessary. In this case, the process of recovering the suspension from the tank 1a is performed.

In the following, the suspension recovery process is described.

When suspension processing is performed, the valve 11f of the gas introduction pipe 7 is first opened, and then the valves 11a and 11c are closed. Consequently, pressurized gas is introduced into the tank 1a. Under the pressure of the pressurized gas, the suspension remaining in the tank 1a is filtered by the tubular filtration elements 2 and the plate filtration element 4 and recovered into the filtrate storage tank.

If the suspension in the tank 1a is decreased by the suspension processing until the level of the suspension becomes lower than the lower ends of the tubular filtration elements 2, then filtration by the tubular filtration elements 2 is stopped. However, since the precoat layers and filtered substances are pressed against the surfaces of the tubular filtration elements 2 by the pressurizing gas, the precoat layers and the filtered substances do not exfoliate and filtration by the plate filtration element 4 continues. Consequently, the suspension in the tank 1a can all be filtered and recovered.

After the suspension in the tank 1a is recovered, the valve 11d is opened and then the valve 11k is closed, whereafter the cleansing solution is flowed reversely from the first delivery pipe 5a to the tank 1a to wash away the filtered substances deposited on the surfaces of the tubular filtration elements 2. The filtered substances washed away by the cleansing solution drop onto the plate filtration element 4 while the cleansing solution is collected into the filtrate collection vessel 3. The cleansing solution is discharged from the discharging pipe 12 via the valve 11d.

Meanwhile, filtered substances adhering as a result of the filtration to the surface of the plate filtration element 4 and the filtered substances dropping from the tubular filtration elements 2 by washing of the tubular filtration elements 2 are deposited on the surface of the plate filtration element 4. In order to wash the plate filtration element 4 on which the filtered substances are deposited, for example, an output port (not shown) for the plate filtration element 4 is formed in the tank 1a so that the plate filtration element 4 can be taken out through the output port and washed. It is a matter of course that the output port must have a sealed structure so that leakage of the suspension through the tank 1a may be prevented during filtration.

Since also the precoat layers come off if washing of the tubular filtration elements 2 and the plate filtration element 4 is performed, precoating processing is performed again after the tubular filtration elements 2 and the plate filtration element 4 are washed.

While an example wherein the filtrate collection vessel 3 on which the plate filtration element 4 is mounted is provided in the inside of the tank 1a is described in the present embodiment, the filtrate collection vessel 3 may be provided such that the plate filtration element 4 serves as the bottom wall of the tank 1a itself.

It is to be noted that, if, at a point in time when recovery of the suspension is completed, the deposited filtered substances on the surfaces of the filtration elements 2 and 4 are so small in amount that the filtering function can be exhibited sufficiently, then the washing step described above is not performed, but the valves 11a, 11c, 11h and 11k are opened to supply the suspension to be filtered into the tank 1a. After the tank 1a is filled with the suspension and a filtering operation is started, the valve 11f is closed to stop the introduction of the gas which presses the precoat layers so that they do not exfoliate.

(Second Embodiment)

Figure 2:
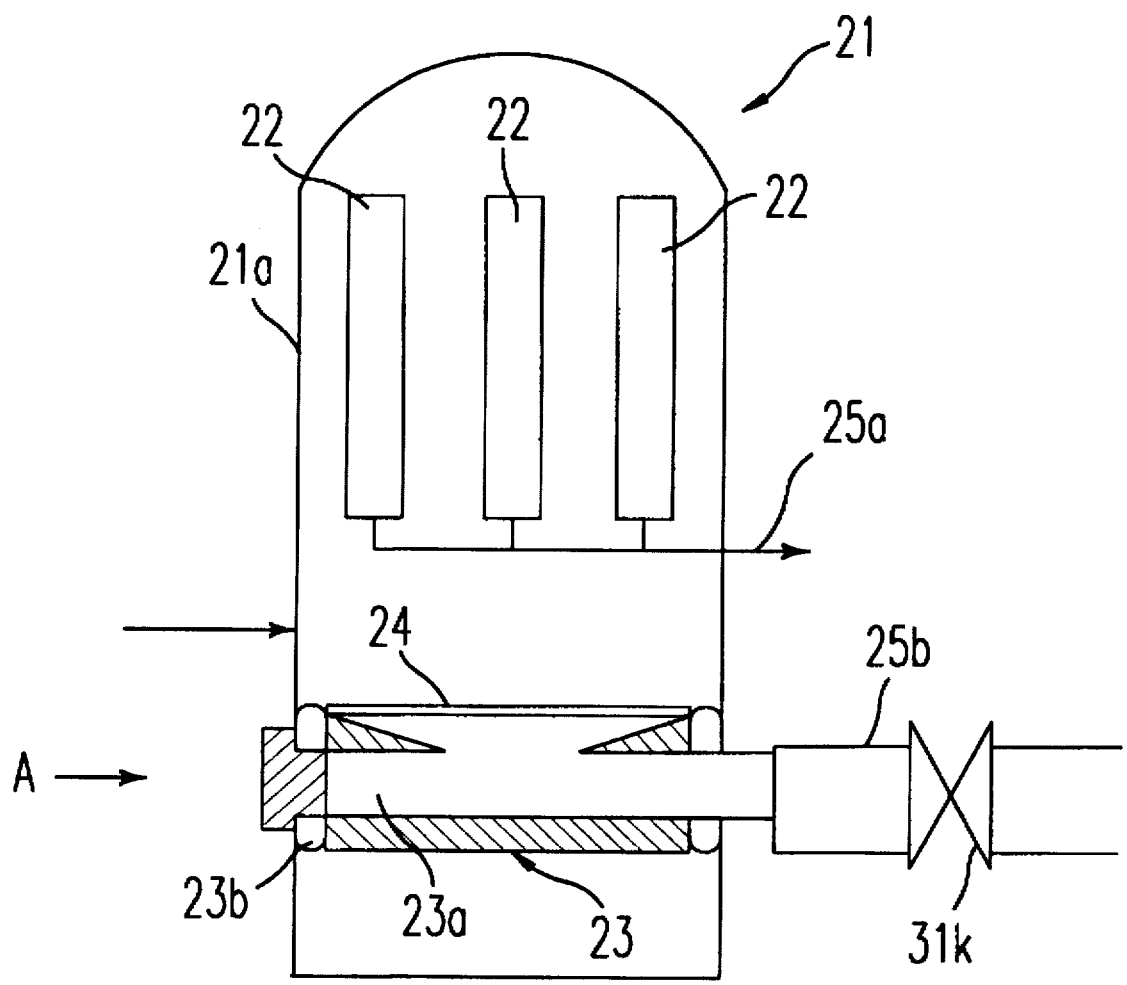
FIG. 2 is a sectional view showing a construction of a second embodiment of the filtration equipment of the present invention.
Figure 3:
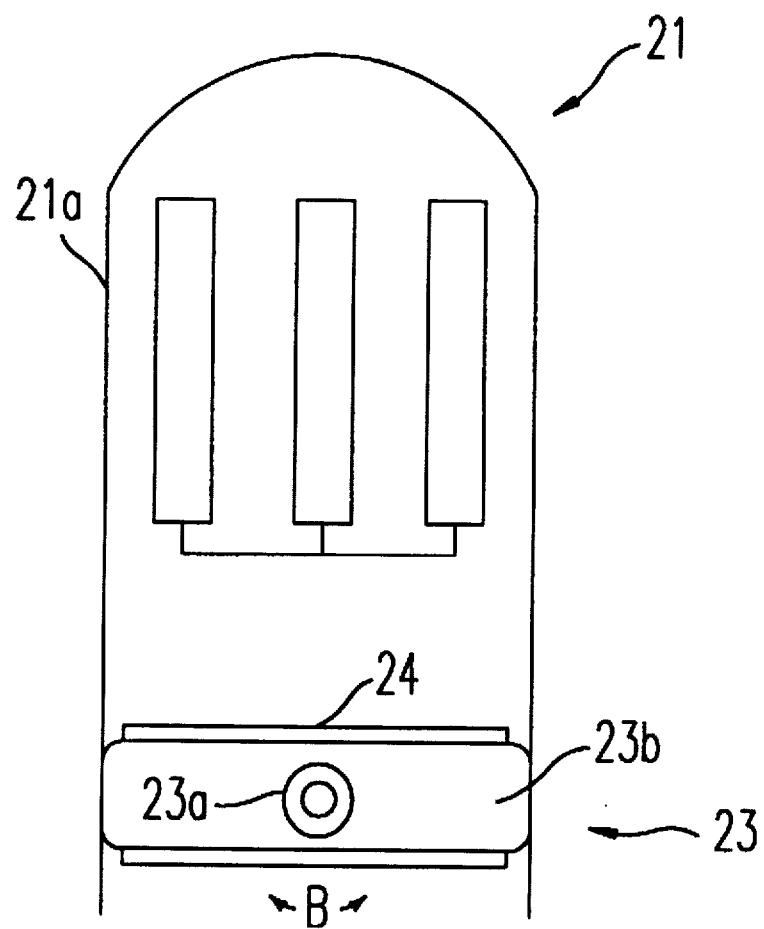
FIG. 3 is a sectional view of the filtration equipment shown in FIG. 2 as viewed in the direction indicated by arrow mark A.

FIG. 2 is a sectional view showing a construction of a second embodiment of a filtration equipment of the present invention, and FIG. 3 is a sectional view of the filtration equipment shown in FIG. 2 as viewed in the direction of an arrow mark A.

The filtration equipment 21 of the present embodiment is different from the first embodiment in two points described below.

Figure 4:
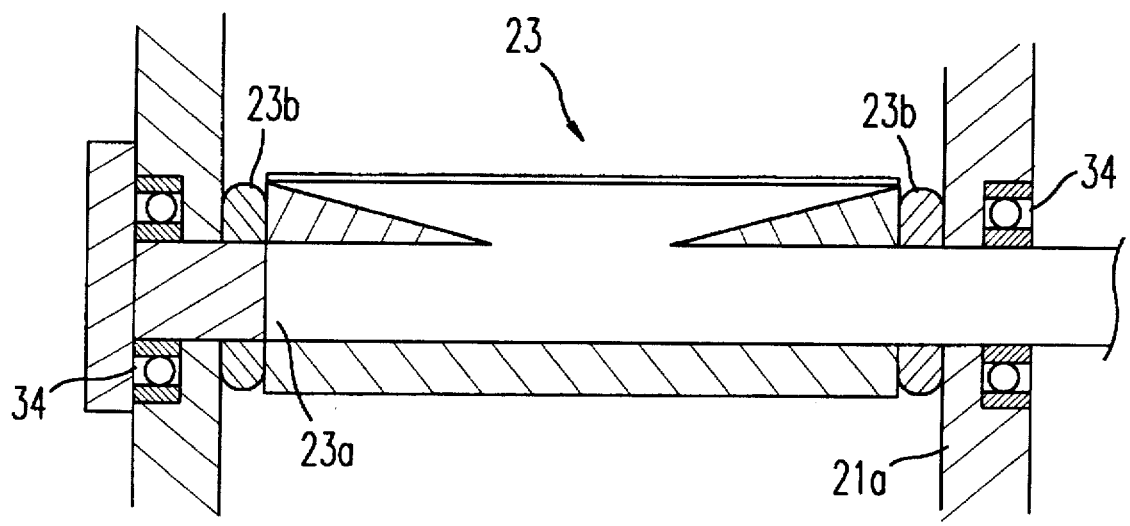
FIG. 4 is a sectional view showing an example of a support structure of a filtrate recovery vessel on a tank of the filtration equipment shown in FIG. 2.

(1) A filtrate collection vessel 23 is supported for pivotal motion around a shaft 23a extending in a horizontal direction. In particular, the filtrate collection vessel 23 is supported for pivotal motion in the direction indicated by an arrow mark B in FIG. 3. A plate filtration element 24 similar to that in the first embodiment is provided on the top face of the filtrate collection vessel 23. A packing 23b is provided on an outer peripheral edge of the plate filtration element 24, and the airtightness of the space in the filtration equipment 21 in which tubular filtration elements 22 are provided is kept by the packing. In order to support the shaft 23a of the filtrate collection vessel 23, for example, as shown in FIG. 4, roller bearings 34 are provided on a tank 21a, and the shaft 23a of the filtrate collection vessel 23 is fitted in the inner races of the roller bearings 34 to support the shaft 23a for rotation.

Figure 5:
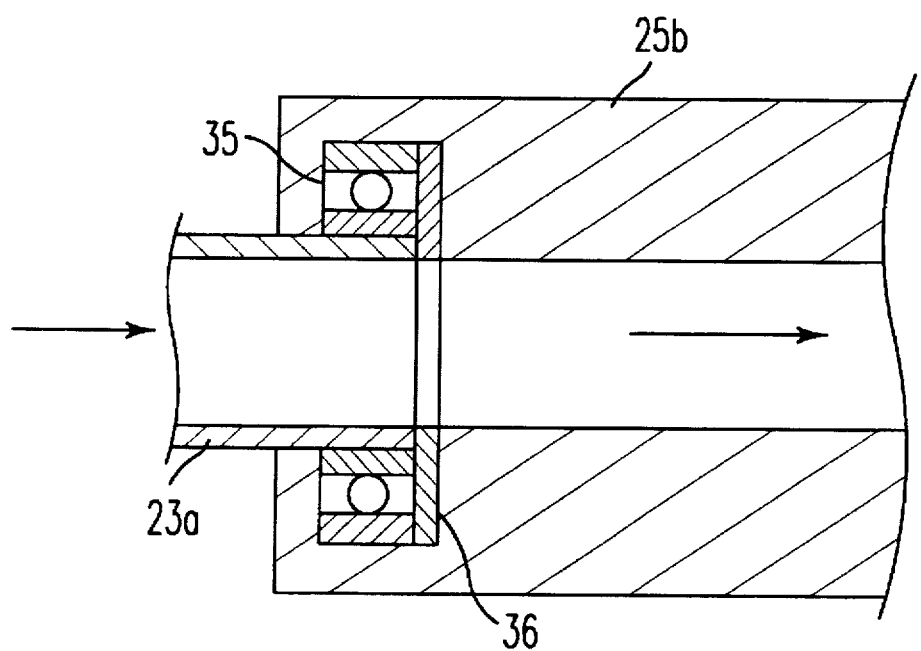
FIG. 5 is a sectional view showing an example of a connection structure of the filtrate recovery vessel to a second delivery pipe of the filtration equipment shown in FIG. 2.

(2) As the filtrate collection vessel 23 is supported for pivotal motion, the filtrate collection vessel 23 is connected for pivotal motion also to a second delivery pipe 25b. In order to connect the filtrate collection vessel 23 and the second delivery pipe 25b to each other, for example, as shown in FIG. 5, a roller bearing 35 is provided on the inner periphery of the second delivery pipe 25b and an end portion of the shaft 23a of the filtrate collection vessel 23 is fitted in the inner race of the roller bearing 35 to support the shaft 23a for rotation. Further, in order to prevent leakage of suspension from the connection location between the shaft 23a of the filtrate collection vessel 23 and the second connection pipe 25b, a packing 36 is provided between the shaft 23a and the second delivery pipe 25b.

Since the other construction is similar to that of the first embodiment, description of it is omitted here.

By providing the filtrate collection vessel 23 for pivotal motion in this manner, washing of the plate filtration element 24 provided on the upper face of the filtrate collection vessel 23 is facilitated. In the following, the washing step of the plate filtration element 24 in the present embodiment is described.

Figure 6A:
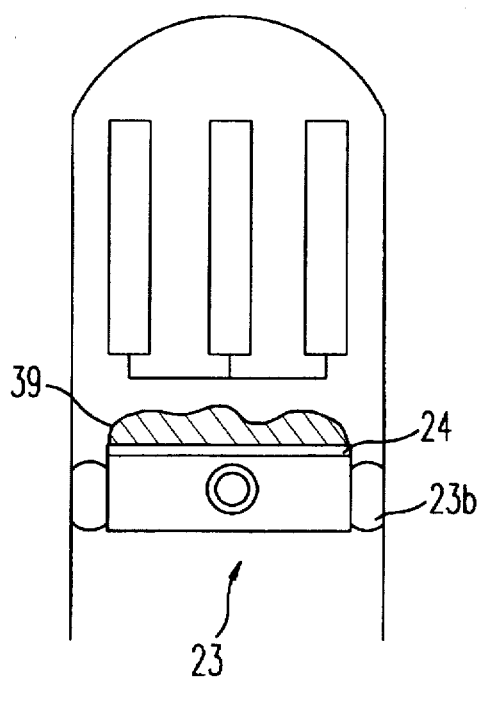
FIGS. 6a and 6b are a view illustrating a washing step of the plate filtration element of the filtration equipment shown in FIG. 2.
Figure 6B:
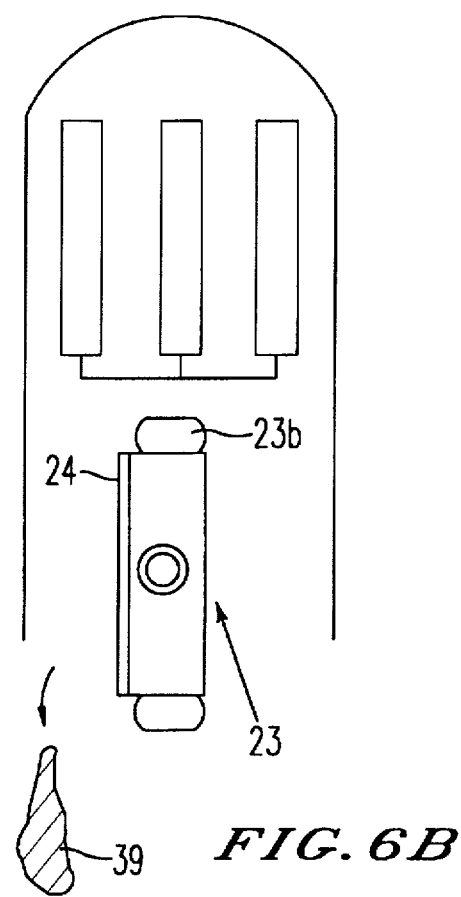

When recovery of the suspension in the tank 21a is completed, a filtered substance 39 remains deposited on the top face of the plate filtration element 24 as seen in (a) of FIG. 6. Thus, if the filtrate collection vessel 23 is pivoted to incline the plate filtration element 24 with respect to a horizontal plane as seen in (b) of FIG. 6, then the filtered substance 39 drops from the plate filtration element 24. The pivotal motion of the filtrate collection vessel 23 may be performed by a rotational driving mechanism (not shown) which makes use of a motor or may be performed manually.

Thereafter, cleaning water is flowed reversely from a first delivery pipe 25a to wash the tubular filtration elements 22. In this instance, if also a valve 31k of the second delivery pipe 25b is open, then the cleaning water flows reversely also from the second delivery pipe 25b, and also the plate filtration element 24 can be washed. Then, the filtered substance 39 is discharged to the outside of the tank together with the cleaning water. After the washing of the tubular filtration elements 22 and the plate filtration element 24 is completed, the filtrate collection vessel 23 is moved back to its original position.

As described above, by providing the filtrate collection vessel 23 for pivotal motion, the filtered substance 39 deposited on the plate filtration element 24 can be discharged to the outside of the tank, and since washing with cleansing solution can be performed in this condition, washing of the plate filtration element 24 is simplified. It is to be noted that, when the filtered substance 39 deposited on the plate filtration element 24 can be exfoliated sufficiently only by causing the filtered substance 39 to be dropped, then washing with cleansing solution need not necessarily be performed. Further, washing of the tubular filtration elements 22 and washing of the plate filtration element 24 may be performed simultaneously or separately from each other. However, when washing of the tubular filtration elements 22 and washing of the plate filtration element 24 are performed separately from each other, washing of the tubular filtration elements 22 must be performed first since filtered substances adhering to the tubular filtration elements 22 drop onto the plate filtration element 24 by washing of the tubular filtration elements 22.

(Third Embodiment)

Figure 7:
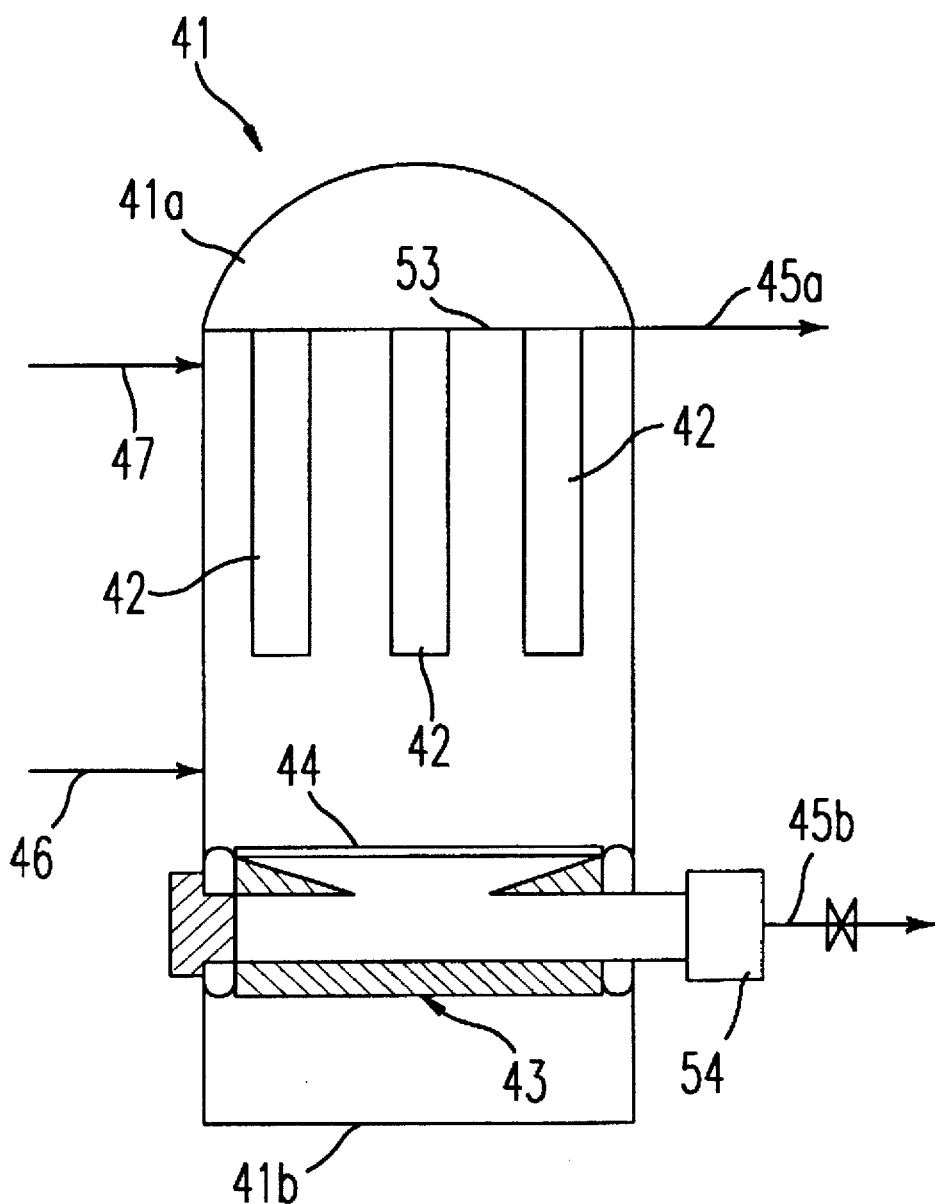
FIG. 7 is a sectional view showing a third embodiment of the filtration equipment of the present invention.

FIG. 7 is a sectional view showing a construction of a third embodiment of the filtration equipment of the present invention.

Figure 10:
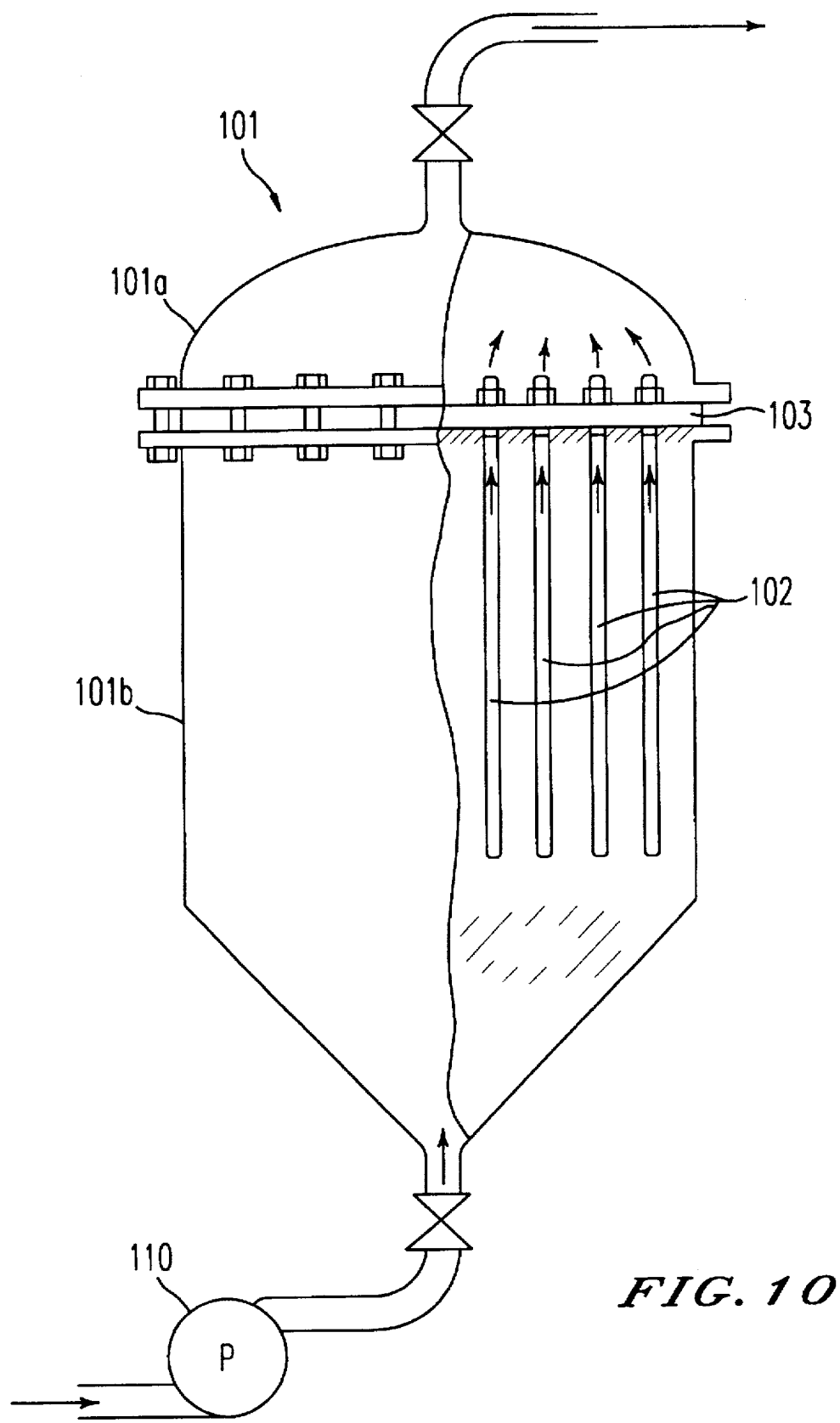
FIG. 10 is a partial sectional view of a conventional filtration equipment of the suspended element type.
Figure 11:
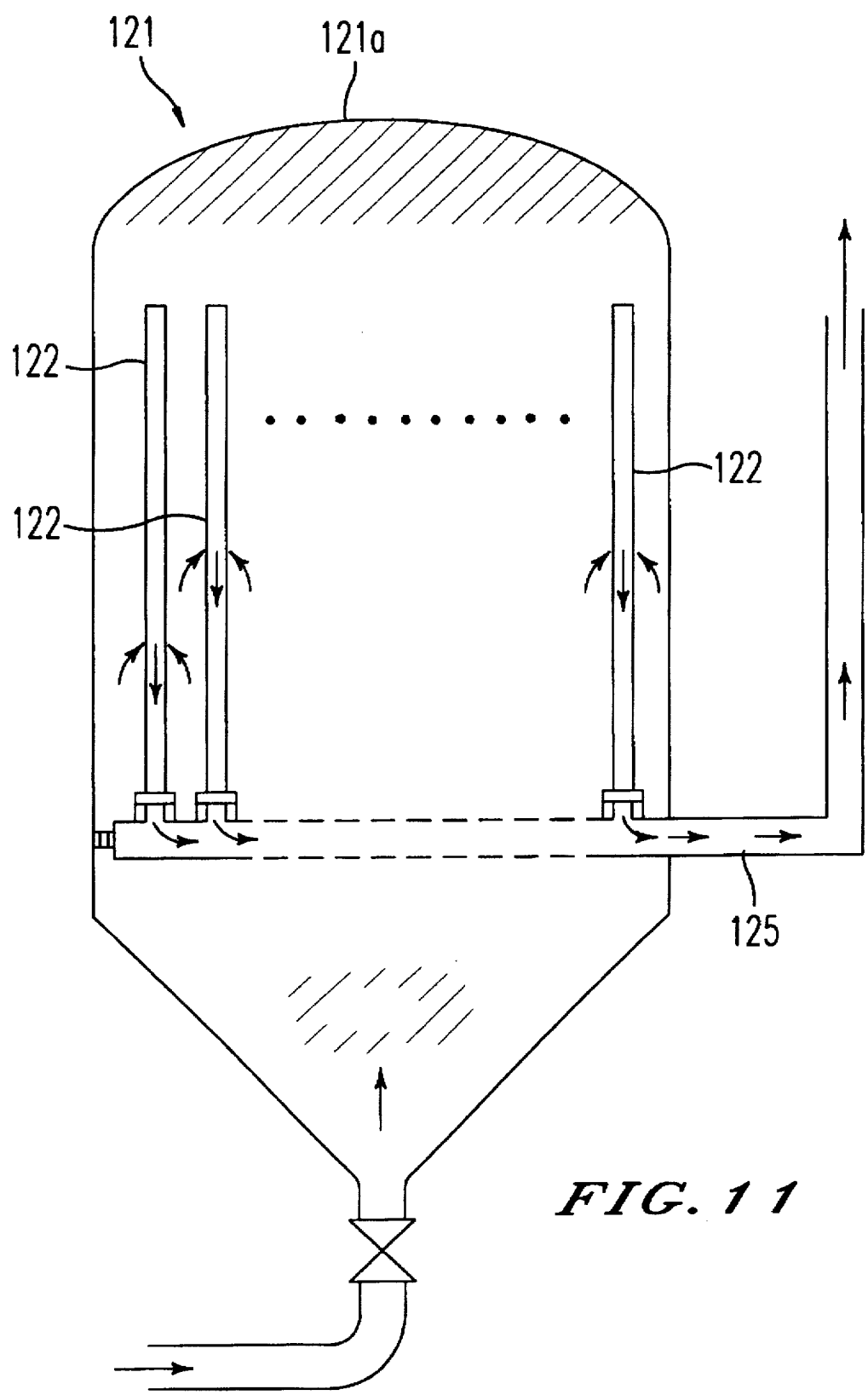
FIG. 11 is a sectional view of a conventional filtration equipment of the upright element type.

The present embodiment is the filtration equipment 41 of the element suspending type and includes an upper tank 41a and a lower tank 41b partitioned and sealed from each other by a partition plate 53. The upper tank 41a and the lower tank 41b are secured by means of bolts and nuts similarly as in the structure shown in FIG. 10. A plurality of tubular filtration elements 42 similar to those of the first embodiment suspend from the partition plate 53.

A first delivery pipe 45a for delivering filtrate filtered by the tubular filtration elements 42 to a filtrate storage tank (not shown) is connected to the upper tank 41a. The first delivery pipe 45a is preferably provided in the proximity of the bottom face of the upper tank 41a, that is, the depth position at which the partition plate 53 is provided. This is so that as much as possible if the filtrate filtered by the tubular filtration elements 42 and arriving at the upper tank 41a can be delivered to the filtrate storage tank. The most preferable form is to provide, in the inside of the partition plate 53, delivery means (liquid flow path) interconnecting the top ends of the tubular filtration elements 42 and the first delivery pipe 45a.

Meanwhile, a filtrate collection vessel 43 is provided for pivotal motion on the lower tank 41b in a similar manner as in the second embodiment. A plate filtration element 44 similar to that of the first embodiment is provided on the top face of the filtrate collection vessel 43. A packing is provided on the outer peripheral edge of the plate filtration element 44, and the airtightness of the space in the lower tank 41b in which the tubular filtration elements 42 is provided is kept by the packing. A second delivery pipe 45b for delivering filtrate filtered by the plate filtration element 44 to the filtrate storage tank is connected to the filtrate collection vessel 43 via a rotary joint 54. The rotary joint 54 may have a construction similar to that shown in FIG. 5, and by means of the rotary joint 54, the filtrate collection vessel 43 is supported for pivotal motion so that it can be inclined with respect to the second delivery pipe 45b.

Further, a gas introduction pipe 47 for introducing pressurized gas during processing of suspension is connected to the lower tank 41b, and the bottom of the lower tank 41b is opened so that filtered substances by the tubular filtration elements 42 and the plate filtration element 44 and cleansing solution can be discharged to the outside therethrough. A suspension supply pipe 46 is connected to a location at the lower tank 41b above the plate filtration element 44.

It is to be noted that, since the construction of the entire filtration system may be the same as that of the first embodiment, description thereof is omitted here.

With the construction described above, during filtration, suspension is supplied through the suspension supply pipe 46 to the lower tank 41b. The suspension is filtered by the tubular filtration elements 42 and the plate filtration element 44. The filtrate filtered by the tubular filtration elements 42 is collected into the upper tank 41a and then delivered to the filtrate storage tank through the first delivery pipe 45a. The filtrate filtered by the plate filtration element 44 is collected into the filtrate collection vessel 43 and then delivered to the filtrate storage tank through the second delivery pipe 45b. Although the filtration of the suspension can be performed only by the tubular filtration elements 42, preferably it is performed by both of the tubular filtration elements 42 and the plate filtration element 44 for the same reason as that of the first embodiment.

Meanwhile, during recovery processing of the suspension in the filtration equipment 41, the gas introduction pipe 47 is opened to introduce pressurized gas into the lower tank 41b, and then the supply of the suspension into lower tank 41b is stopped. Under the pressure of the pressurized gas, the suspension remaining in the lower tank 41b is filtered by the tubular filtration elements 42 and the plate filtration element 44 and recovered. After the suspension in the lower tank 41b decreases in amount as a result of the recovery until the filtration faces of the tubular filtration elements 42 are exposed, the pressurized gas flows through the exposed portions of the filtration faces to the filtrate side and the filtration by the tubular filtration elements 42 is no longer performed. However, since the filtration by the plate filtration element 44 continues, the suspension in the filtration equipment 41 can be filtered fully and recovered. Moreover, since filtration can be performed by the plate filtration element 44 even after filtration by the tubular filtration elements 42 becomes impossible, even if the pressure of the pressurized gas to be introduced into the lower tank 41b is raised higher than 0.1 to 0.2 kgf/cm$^2$, there is no problem and recovery of the suspension remaining in the lower tank 41b can be performed efficiently.

Since washing of the tubular filtration elements 42 and the plate filtration element 44 after the recovery of the suspension in the filtration equipment 41 is similar to that in the second embodiment, description of it is omitted here.

(Fourth Embodiment)

Figure 8:
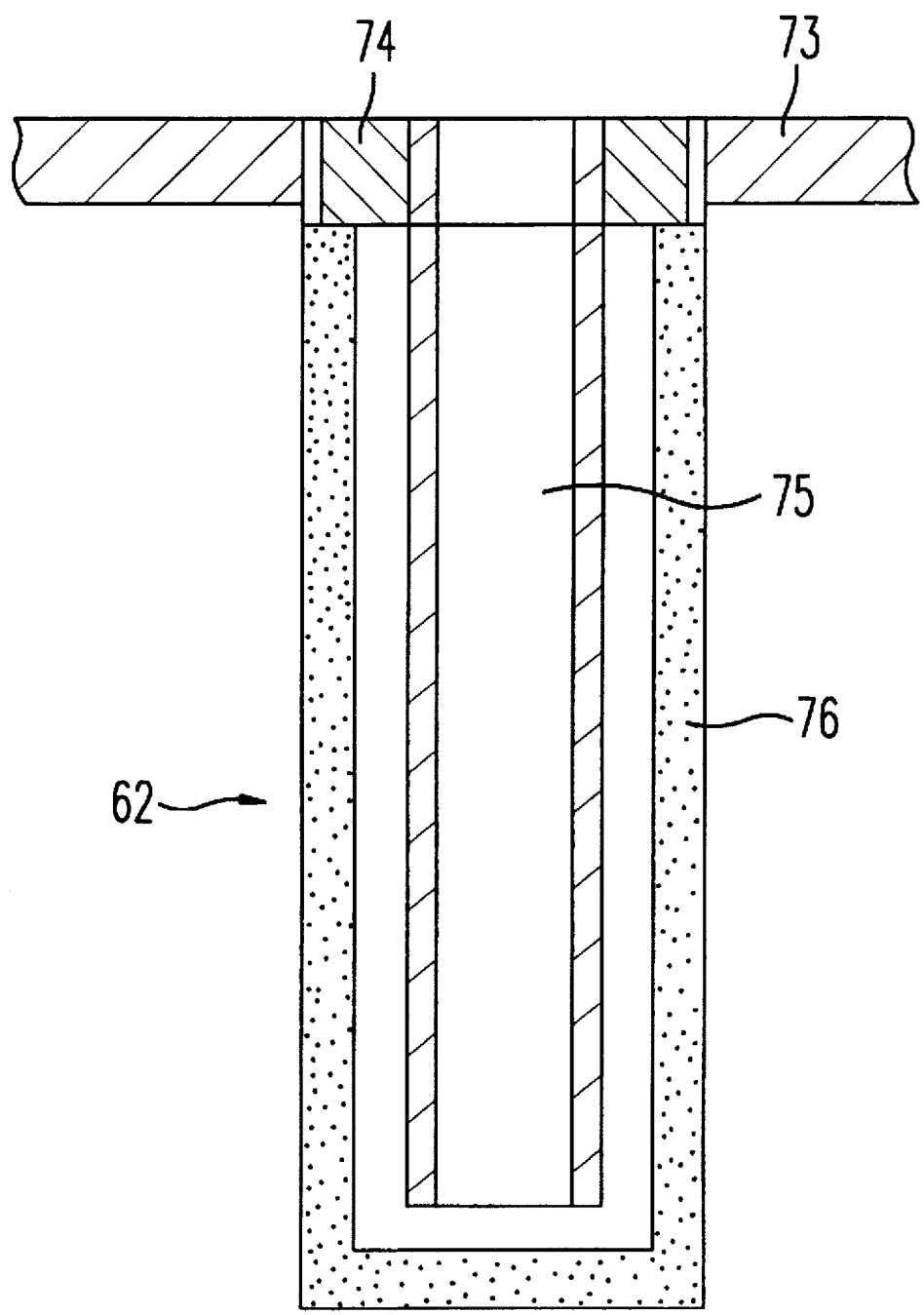
FIG. 8 is a sectional view of a tubular filtration element with a siphon pipe of a fourth embodiment of the of the filtration equipment of the present invention.

FIG. 8 is a sectional view of a filtration element with a siphon pipe of a fourth embodiment of the filtration equipment of the present invention. While, in the third embodiment, a known tubular filter is used for the tubular filtration elements, in the present embodiment, a tubular filtration element 62 with a siphon pipe which is an improvement of the tubular filter is employed. Since the construction except the tubular filtration element 62 with a siphon pipe is similar to that of the third embodiment, the tubular filtration element 62 with a siphon pipe employed in the present embodiment is described below.

The tubular filtration element 62 with a siphon pipe is formed from an extraction pipe 75 suspending through and from a mounting bracket 74, and a filtration member 76 fixed to the mounting bracket 74 and surrounding the extraction pipe 75 in a spaced relationship from the extraction pipe 75 so that a flow path may be formed on the outer side of the extraction pipe 75. And, the tubular filtration element 62 with a siphon pipe is mounted on a partition plate 73 by fitting or screwing the mounting bracket 74 into a hole formed in the partition plate 73. Consequently, the top end of the filtration member 76 is closed up with the mounting bracket 74 while the top end of the extraction pipe 75 is open in an upper tank (not shown).

For the filtration member 76, a known cylindrical filter made of a ceramics material, a porous cylindrical filter made of a sintered metal, a filter of the winding type or a filter of some other suitable type is used. Further, the lower end of the filtration member 76 is closed up integrally with the same material as the material (a ceramics material or a sintered metal) from which the side wall of the filtration member 76 is formed so that the lower end may have a function as a filter. However, the lower end need not necessarily have a function of a filter, and the lower end of the filtration member 76 may be closed up with a material different from the material of the side wall of the filtration member 76.

The extraction pipe 75 may be secured to the mounting bracket 74 by fitting or screwing the extraction pipe 75 into the mounting bracket 74 or may be formed integrally with the mounting bracket 74. Further, the filtration member 76 may be secured to the mounting bracket 74 by fitting or securely screwing the filtration member 76 into the lower end of the mounting bracket 74 or may be secured by adhesion.

By employing the tubular filtration element 62 with a siphon pipe wherein the extraction pipe 75 is provided on the inner side of the filtration member 76 in this manner, in the tubular filtration element 62 with a siphon pipe, suspension passes through and is filtered by the filtration member 76. Further, the filtrate filtered by the filtration member 76 enters into the extraction pipe 75 from the lower end and reaches the top end of the extraction pipe 75 through a hollow portion of the extraction pipe 75, and is collected into the upper tank. Consequently, upon processing of the suspension in the filtration equipment, even if the level of the solution becomes lower than the filtration face of the tubular filtration element 62 with a siphon pipe, until after the level of the solution reaches the lower end of the extraction pipe 75, filtration and recovery by both of the tubular filtration element 62 with a siphon pipe and the plate filtration element (not shown) can be performed, and consequently, the recovery operation can be facilitated.

The amount of suspension which can be recovered by such a tubular filtration element 62 with a siphon pipe as described above depends upon the position of the lower end of the extraction pipe 75 with respect to the lower tank. Therefore, in order to recover as much as possible if the suspension with the tubular filtration element 62 with a siphon pipe, preferably the lower end of the extraction pipe 75 is extended to a location as near as possible to the lower end of the filtration member 76. Further, as regards the length of the filtration member 76, where a filtration collection vessel (not shown) is provided for pivotal motion, it is preferable to make the filtration member 76 as long as possible within a range in which the filtration member 76 does not interfere with the filtration collection vessel. Where the filtration collection vessel is fixed, the filtration member 76 can be extended in length until the lower end thereof is positioned immediately above the plate filtration element.

(Fifth Embodiment)

Figure 9:
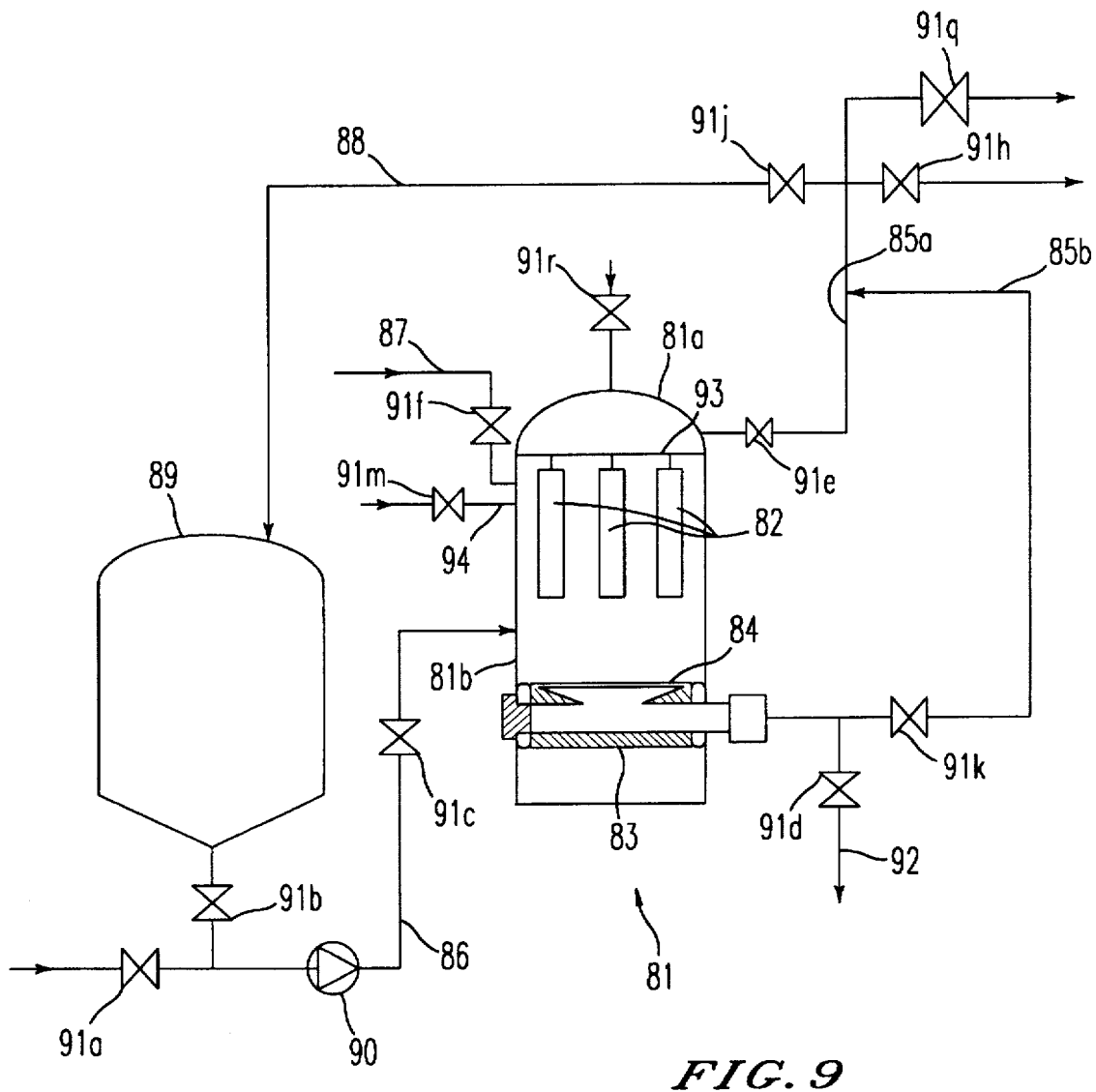
FIG. 9 is a sectional view showing a construction of a fifth embodiment of the filtration equipment of the present invention.

FIG. 9 is a schematic view of a filtration system in which a fifth embodiment of the filtration equipment of the present invention is employed.

As shown in FIG. 9, the filtration equipment 81 of the present embodiment is of the type wherein a filtration element with a siphon pipe is suspended, and includes an upper tank 81a and a lower tank 81b partitioned and sealed from each other by a partition plate 93. A plurality of tubular filtration elements 82 having closed up lower ends are suspended on the partition plate 93.

A first delivery pipe 85a for delivering filtrate filtered by the tubular filtration elements 82 to a filtrate storage tank (not shown) is provided in the upper tank 81a and extends through a side wall of the tank 81a. The first delivery pipe 85a to which a valve 91e is attached is preferably provided in the proximity of the bottom face of the upper tank 81a, that is, the depth position at which the partition plate is provided. This is so that as much as possible of the filtrate filtered by the tubular filtration elements 82 and coming to the upper tank 81a can be delivered to the filtrate storage tank. The most preferable form is to provide, in the inside of the partition plate 93, delivery means (solution flow path) interconnecting the top ends of the tubular filtration elements 82 and the first delivery pipe 85a. Further, a pipe provided with a valve 91r for the introduction of pressurized gas is located at a top portion of the tank.

Further, a filtrate collection vessel 83 connected to a second delivery pipe 85b serving as second delivery means via a valve 91k is provided for pivotal motion at a lower portion of the lower tank 81b. A plate filtration element 84 is mounted on the top face of the filtrate collection vessel 83. A packing is provided over the entire circumference on an outer peripheral edge of the plate filtration element 84, and the airtightness of the space in the inside of the lower tank 81b in which the tubular filtration elements 82 are provided is kept by the packing. This is to prevent suspension supplied into the lower tank 81b from above the plate filtration element 84 from leaking to a location below the plate filtration element 84. Further, a discharging pipe 92 is connected to a line from the filtrate collection vessel 83 to the valve 91k with a valve 91d interposed therein so that filtrate passing through the plate filtration element 84 is discharged from the tank therethrough.

The second delivery pipe 85b joins to an intermediate portion of the first delivery pipe 85a, and consequently, the second delivery pipe 85b is connected to the filtrate storage tank via the first delivery pipe 85a. A valve 91h is provided on the downstream side of the first delivery pipe 85a with respect to the joining portion with the second delivery pipe 85b, and a valve 91q is provided for a branching pipe.

An suspension supply pipe 86 is connected to a portion of the lower tank 81b above the plate filtration element 84 with a valve 91c interposed therein. A pump 90 is provided for the suspension supply pipe 86, and by changing over valves 91a and 91b, suspension stored in an suspension tank (not shown) or precoat solution stored in a precoat tank 89 is supplied to the tank 81b. The precoat solution contains filter aid to be precoated on the surfaces of the tubular filtration elements 82 and the plate filtration element 84 prior to filtration of the suspension. For the filter aid, diatomaceous earth, perlite, cellulose or some other substance is used.

A water introduction pipe 94 serving as pressurized water introduction means for introducing pressurized water into the inside of the tank 81b is connected to an upper portion of the tank 81b, and a valve 91m is provided for the water introduction pipe 94. Further, a gas introduction pipe 87 serving as pressurized gas introduction means for introducing pressurized air or pressurized gas such as carbon dioxide into the tank 81b is connected to the tank 81b, and a valve 91f is provided for the gas introduction pipe 87.

A precoating solution feedback pipe 88 is provided to return precoat solution supplied to the filtration equipment 81 to the precoat tank 89 and is connected to the upstream side of the first delivery pipe 85a with respect to the valve 91h, and a valve 91j is provided for the precoating solution feedback pipe 88.

It is to be noted that, while, for the materials of the tubular filtration elements 82 and the plate filtration element 84, a filter made of a porous material such as a ceramics material or a sintered metal or a filter of the winding type can be used, since the elements may possibly corrode depending upon the properties of the suspension (acid, alkali, high temperature and so forth), an optimum material is used as the material of the elements depending on the properties of the suspension.

Operation of the filtration system of the present embodiment is described below.

First, precoating processing performed prior to filtration of suspension is described. Upon precoating, the valves 91b, 91c, 91e, 91k and 91j are opened, and then, the pump 90 is started so that the precoating solution is circulated from the precoat tank 89 through the suspension supply pipe 86→filtration equipment 81→first delivery pipe 85a, second delivery pipe 85b→precoating solution feedback pipe 88→precoat tank 89. Thereafter, the five valves mentioned above are closed. As a result, a precoat layer is formed on the surfaces of the tubular filtration elements 82 and the surface of the plate filtration element 84.

Next, the filtration operation is described. The valves 91a, 91c, 91e, 91h and 91k are opened and the pump 90 is rendered operative. Consequently, the suspension in the suspension tank is supplied into the tank 81b through the suspension supply pipe 86 and is filtered by the tubular filtration elements 82 and the plate filtration element 84. The filtrate filtered by the tubular filtration elements 82 is delivered to the filtrate storage tank through the first delivery pipe 85a. Meanwhile, the filtrate filtered by the plate filtration element 84 is collected into the filtrate collection vessel 83 and delivered to the filtrate storage tank through the second delivery pipe 85b.

Here, although filtration is performed by the tubular filtration elements 82 and the plate filtration element 84, it is also possible to close the valve 91k so that filtration is performed only by the tubular filtration elements 82. However, unless solution is flowing, during filtration, from the primary side (suspension side) to the secondary side (filtrate side), that is, unless the precoat layers are in a condition pressed against the surfaces of the filtration elements, the precoat layers are liable to exfoliate, and accordingly, the tubular filtration elements 82 must always remain in a filtering condition. Further, also the filtration efficiency is improved by performing filtration with the tubular filtration elements 82 and the plate filtration element 84.

After filtration is perform for a long period of time, filtered substances adhere to and are deposited on the surfaces of the tubular filtration elements 82 and the surface of the plate filtration element 84. Since the filtration processing is deteriorated if filtered substances are deposited on the surfaces of the tubular filtration elements 82 and the surface of the plate filtration element 84, the filtered substances deposited on the tubular filtration elements 82 and the plate filtration element 84 are removed in accordance with necessity. Thereupon, the process of recovering the suspension from the filtration equipment 81 is performed first.

The process of recovering the suspension is described below.

In the process of recoverying suspension, the valves 91e and 91k are opened and the valve 91m of the water introduction pipe 94 is opened to introduce pressurized water into the tank 81b, and the valve 91c at the exit/entrance for the suspension is closed. Driven by the pressurized water, the suspension remaining in the tank 81b is filtered by the tubular filtration elements 82 and the plate filtration element 84 and recovered into the filtrate storage tank.

As the suspension in the tank 81b decreases as a result of the suspension recovery processing, the ratio of water to be mixed into the filtrate increases. Accordingly, the concentration of the filtrate in the proximity of each of the valves 91e and 91k is monitored by electric conductivity, chromaticity or the like, and when the two suspension concentrations exhibit lower concentrations than a fixed level, the valves 91d and 91q are opened while the valves 91h and 91k are closed, thereby substantially completing the process of recovering the suspension.

The next step is discharging the pressurized water from the tank. In the condition described above, the pressurized gas valve 91f at the upper location of the suspension side tank is opened to introduce pressurized gas from the upper location to discharge the pressurized water through the upper and lower filtration elements 82 and 84 and the valves 91d and 91q. The pressure of the pressurized gas is selected to a suitable value in accordance with the rate at which the solution in the tank is discharged.

After the solution in the tank is discharged fully, the condition is maintained. As a result, water in the filtered substances (called sludge) adhering to the surfaces of the filters is expelled from the sludge by the pressurized gas and discharged to the outside of the tank together with the pressurized gas through the valves 91d and 91q.

Then, the valves 91d, 91f and 91q are closed and the pressurized gas valve 91r on the filtrate side is opened so that gas is jetted from the insides of the tubular filtration elements 82 to exfoliate and drop the deposited sludge. Meanwhile, the adhering sludge and the sludge dropping from the tubular filtration elements 82 are deposited on the surface of the plate filtration element 84. Also the pressurized gas is discharged via the valve 91d.

Since the operation for the removal of the deposited substances on the plate filtration element 84 is similar to that in the second embodiment (FIGS. 2 to 6), description thereof is omitted here.

It is to be noted that, while the sludge in the first to fourth embodiments described above is processed using a cleansing agent and discharged, discharging the sludge after it is dried as in the present embodiment rather than discharing it in the form mud is advantageous in that the succeeding processing can be simplified. From this, also in the first to fourth embodiments, the sludge on the surfaces of the filters may be exfoliated and removed after it is dried by pressurized gas similarly as in the fifth embodiment.

While, in the present fifth embodiment, an element with a siphon of the suspended type is used for the tubular filtration elements, also an ordinary tubular filtration element of the upright type is not outside the scope of the present invention. However, where an ordinary tubular filtration element is employed, since the mixture ratio of the pressurized water in the filtrate increases in proportion to the ratio at which the overall surface of the element contacts with the pressurized water, if the allowance for the filtrate is set to a severe value, then the filtration by the tubular filtration element cannot be performed for a long time, and the filtration efficiency is deteriorated comparing with that of the apparatus of the fifth embodiment.

Results of an experiment based on the fifth embodiment are described.

(1) Filtration of Beer

The upper elements of 1,000 mm were used, and when filtration using diatomaceous earth was ended at the precoat filtration pressure difference of 1.0 kgf/cm$^2$, filtrate was recovered using $CO_2$ gas by the conventional method. In this instance, when the gas pressure difference was set to 10 kgf/cm$^2$, the recovery rate was substantially equal to that upon filtration of beer, but mixture of gas into the filtrate side occurred at locations of the upper elements spaced by approximately 300 mm from the tops. When the gas pressure difference was 0.5 kgf/cm², recovery of filtrate was possible without causing mixture of gas until the solution level fell to a location in the proximity of the lower ends of the upper elements, but the recovery rate was deteriorated to approximately one half.

In the present embodiment, in recovery of suspension by the water pressure of the pressure difference of 1.0 kgf/cm², recovery was possible while maintaining a recovery rate substantially equal to that of filtration. Thereafter, the water was discharged, and removal of sludge by gas purge was performed, which succeeded in exfoliation of the sludge and discharging of the sludge as dry sludge.

(2) Filtration of the Lees of Sake

The upper elements of 1,000 mm was used, and the filtration equipment was used for the separation filtration of the lees. In the case of the final pressure difference of 5.0 kgf/cm², when filtration recovery was performed using air of the pressure difference of 5.0 kgf/cm², mixture of gas into the filtrate side occurred at locations of the upper elements spaced approximately by 100 mm from the tops. When the pressure difference was 0.5 kgf/cm², the filtration recovery was stopped at locations of the upper elements spaced by 50 mm from the tops.

In the case of the present embodiment, in filtrate recovery with the water pressure of the pressure difference of 5.0 kgf/cm², recovery was possible while maintaining a filtrate recovery rate substantially equal to that of filtration. Thereafter, the water was discharged, and discharge of sludge by gas purge was performed, which succeeded in exfoliation of the sludge and discharging of the sludge as dry sludge.

We claim:

1. A filtration equipment with a filtrate recovery process, which comprises, a tank to which suspension before filtration is supplied, tubular filtration elements provided in said tank for filtering the suspension, delivery means for delivering the filtrate filtered by said tubular filtration elements to the outside of said tank, a plate filtration element located below said tubular filtration elements in the inside of said tank for maintaining the airtightness of the space in which said tubular filtration elements are provided, second delivery means for delivering the filtrate filtered by said plate filtration element to the outside of said tank, and pressurized gas introduction means located upstream of the tubular filtration elements and the plate filtration element for introducing pressurized gas into said tank when the suspension in said tank is recovered.

2. A filtration equipment with a filtrate recovery process, which comprises, a tank to which suspension before filtration is supplied, tubular filtration elements provided in said tank for filtering the suspension, delivery means for delivering the filtrate filtered by said tubular filtration elements to the outside of said tank, a plate filtration element located below said tubular filtration elements in the inside of said tank for maintaining the airtightness of the space in which said tubular filtration elements are provided, second delivery means for delivering the filtrate filtered by said plate filtration element to the outside of said tank, pressurized liquid introduction means for introducing pressurized liquid into said tank when the suspension in said tank is recovered, and pressurized gas introduction means located upstream of the tubular filtration elements and the plate filtration element for introducing pressurized gas into said tank in order to discharge the remaining pressurized liquid used for the recovery of the suspension remaining in said tank to the outside of said tank.

3. A filtration equipment as claimed in claim 1 or 2, wherein said tubular filtration elements and said plate filtration element are fluidically arranged in parallel.

4. A filtration equipment as claimed in claim any one of claims 1 to 2, wherein said plate filtration element is installed so that it can be inclined with respect to a horizontal plane.

5. A filtration equipment as claimed in claim 3, wherein said plate filtration element is installed so that it can be inclined with respect to a horizontal plane.

* * * * *